United States Patent
Scott et al.

(10) Patent No.: US 12,542,602 B2
(45) Date of Patent: Feb. 3, 2026

(54) DISTRIBUTED ADAPTIVE CODING AND MODULATION

(71) Applicant: The Boeing Company, Arlington, VA (US)

(72) Inventors: James P. Scott, Manhattan Beach, CA (US); Dennis L. Gould, Whittier, CA (US)

(73) Assignee: The Boeing Company, Arlington, VA (US)

( * ) Notice: Subject to any disclaimer, the term of this patent is extended or adjusted under 35 U.S.C. 154(b) by 320 days.

(21) Appl. No.: 18/471,483

(22) Filed: Sep. 21, 2023

(65) Prior Publication Data

US 2025/0105912 A1    Mar. 27, 2025

(51) Int. Cl.
*H04B 7/185* (2006.01)

(52) U.S. Cl.
CPC ..... *H04B 7/18513* (2013.01); *H04B 7/18519* (2013.01)

(58) Field of Classification Search
CPC ............ H04B 7/18513; H04B 7/18519; H04B 7/18521; H04B 7/18584; H04B 7/1851; H04B 7/18586; H04B 7/18526; H04B 10/118; H04B 7/18578; H04B 7/18589; H04B 7/18508; H04B 7/185

See application file for complete search history.

(56) References Cited

U.S. PATENT DOCUMENTS 10,771,989 B2    9/2020  Scott
2018/0167133 A1*  6/2018  Choquette .......... H04B 7/18521

OTHER PUBLICATIONS

Ongaro, D. et al., "In Search of an Understandable Consensus Algorithm", 2014 USENIX Annual Technical Conference, Jun. 19-20, 2014, pp. 305-319, USENIX Association, Philedelphia, PA.
Lamport, L., "The Part-Time Parliament", ACM Transactions on Computer Systems, May 1998, pp. 133-169, vol. 16 No. 2.
Heinanen, J. et al., "A Two Rate Three Color Marker", Network Working Group, Sep. 1999, pp. 1-5, The Internet Society.
Hunter, J.S., "The Exponentially Weighted Moving Average", Journal of Quality Technology, Oct. 1986, pp. 203-210, vol. 18 No. 4.

(Continued)

*Primary Examiner* — Keith Ferguson
(74) *Attorney, Agent, or Firm* — Harrity & Harrity, LLP

(57) ABSTRACT

A distributed adaptive coding and modulation network includes multiple network hubs that move relative to Earth, communicate among each other using intra-hub links, communicate with endpoint devices via wireless links, and elect one network hub to operate as a leader hub. A remainder of the network hubs operate as follower hubs. The leader hub is operational to negotiate a current modulation and coding scheme with the follower hubs based on a session management protocol, communicate with a first endpoint device, relay data between the endpoint devices using the current modulation and coding scheme, and dynamically renegotiate the current modulation and coding scheme in response to a change in link conditions based on the session management protocol. An edge follower hub is operational to communicate with a second endpoint device, and relay the data between the endpoint devices through the inter-hub links using the current modulation and coding scheme.

20 Claims, 7 Drawing Sheets

(56) References Cited

OTHER PUBLICATIONS

Jung, D.H. et al., "Adaptive coding and modulation (ACM) and power control scheme for return link of DVB-RCS2 satellite system", Advances in Communications Satellite Systems, Proceedings of the 37th International Communications Satellite Systems Conference (ICSSC-2019), Okinawa, Japan, 2019, pp. 1-10.
Digital Video Broadcasting (DVB); Second generation framing structure, channel coding and modulation systems for Broadcasting, Interactive Services, News Gathering and other broadband satellite applications; Part 2:DVB-S2 Extensions (DVB-S2X), 2014, European Telecommunications Standards Institute.

* cited by examiner

DISTRIBUTED ADAPTIVE CODING AND MODULATION

TECHNICAL FIELD

The disclosure relates generally to adaptive coding and modulation, and in particular, to distributed adaptive coding and modulation.

BACKGROUND

Current space-based networks perform Adaptive Coding Modulation using a hub-and-spoke topology where endpoint devices are attached by spokes to a centralized hub in orbit. The hub-and-spoke topology means that the endpoint devices are attached to the single centralized hub, and are not designed to operate in a distributed network environment. Communications between the endpoint devices and the centralized hub are limited by lines-of-sight. Therefore, a separation between the endpoint devices is governed by an altitude of the centralized hub and a curvature of the Earth.

Accordingly, those skilled in the art continue with research and development efforts in the field of adaptive coding and modulation through distributed and moving network hubs.

SUMMARY

A distributed adaptive coding and modulation network is provided herein. The distributed adaptive coding and modulation network includes a plurality of network hubs operational to: move relative to Earth; communicate among each other using one or more inter-hub links; communicate with two endpoint devices via two respective wireless links; and elect one of the plurality of network hubs to operate as an adaptive coding and modulation leader hub based on a leader election technique. A remainder of the plurality of network hubs operate as adaptive coding and modulation follower hubs. The adaptive coding and modulation leader hub is further operational to: negotiate a current modulation and coding scheme among a plurality of available modulation and coding schemes with the adaptive coding and modulation follower hubs between the two endpoint devices based on a session management protocol; communicate with a first endpoint device of the two endpoint devices; relay data between the two endpoint devices through the one or more inter-hub links and an edge follower hub of the adaptive coding and modulation follower hubs using the current modulation and coding scheme; and dynamically renegotiate the current modulation and coding scheme in response to a change in link conditions based on the session management protocol. The edge follower hub is further operational to: communicate with a second endpoint device of the two endpoint devices; and relay the data between the two endpoint devices through the one or more inter-hub links and the adaptive coding and modulation leader hub using the current modulation and coding scheme.

In one or more embodiments of the distributed adaptive coding and modulation network, the negotiation of the current modulation and coding scheme is further based on a signal-to-noise ratio and an estimated power margin.

In one or more embodiments of the distributed adaptive coding and modulation network, the negotiation of the current modulation and coding scheme is further based on a requested data rate of the session management protocol offered by the two endpoint devices.

In one or more embodiments of the distributed adaptive coding and modulation network, the plurality of network hubs: include a plurality of queues operational to buffer the data; and are further operational to low-pass filter a plurality of occupancy statistics of the plurality of queues to maintain stability.

In one or more embodiments of the distributed adaptive coding and modulation network, the plurality of network hubs: include a plurality of queues operational to buffer the data; and are further operational to token bucket filter a rate of the data per epoch in the plurality of queues to meter and mark arriving traffic for compliance to a service level agreement.

In one or more embodiments of the distributed adaptive coding and modulation network, the plurality of network hubs are further operational to prioritize a plurality of messages associated with the leader election technique and the session management protocol above the data from the two endpoint devices.

In one or more embodiments of the distributed adaptive coding and modulation network, one or more additional network hubs of the plurality of network hubs participate in the relay of the data between the adaptive coding and modulation leader hub and the edge follower hub In one or more embodiments of the distributed adaptive coding and modulation network, the plurality of network hubs are located above an atmosphere of the Earth.

In one or more embodiments of the distributed adaptive coding and modulation network, the plurality of network hubs are located within an atmosphere of the Earth.

In one or more embodiments of the distributed adaptive coding and modulation network, at least one of the two endpoint devices is airborne in the atmosphere.

A method for distributed adaptive coding and modulation is provided herein. The method includes communicating among a plurality of network hubs using one or more inter-hub links. The plurality of network hubs are operational to move relative to Earth. The method includes communicating between the plurality of network hubs and two endpoint devices via two respective wireless links; and electing, among the plurality of network hubs, one of the plurality of network hubs to operate as an adaptive coding and modulation leader hub based on a leader election technique. A remainder of the plurality of network hubs operate as adaptive coding and modulation follower hubs. The method includes communicating between the adaptive coding and modulation leader hub and a first endpoint device of the two endpoint devices; communicating between an edge follower hub of the adaptive coding and modulation follower hubs and a second endpoint device of the two endpoint devices; negotiating, with the adaptive coding and modulation leader hub, a current modulation and coding scheme among a plurality of available modulation and coding schemes with the adaptive coding and modulation follower hubs between the two endpoint devices based on a session management protocol; relaying data between the two endpoint devices through the adaptive coding and modulation leader hub, the one or more inter-hub links, and the adaptive coding and modulation edge follower hub using the current modulation and coding scheme; and renegotiating the current modulation and coding scheme dynamically in response to a change in link conditions based on the session management protocol.

In one or more embodiments of the method, the negotiating of the current modulation and coding scheme is based on a signal-to-noise ratio and an estimated power margin.

In one or more embodiments of the method, the negotiating of the current modulation and coding scheme is based on a requested data rate of the session management protocol offered by the two endpoint devices.

In one or more embodiments of the method, the plurality of network hubs include a plurality of queues operational to buffer the data. The method further includes filtering a plurality of occupancy statistics of the plurality of queues with a plurality of low-pass filters to maintain stability.

In one or more embodiments of the method, the plurality of network hubs include a plurality of queues operational to buffer the data. The method further includes filtering a rate of the data per epoch in the plurality of queues with a token bucket filter to meter and mark arriving traffic for compliance to a service level agreement.

In one or more embodiments, the method includes prioritizing in the plurality of network hubs a plurality of messages associated with the leader election technique and the session management protocol above the data from the two endpoint devices.

In one or more embodiments, the method includes relaying the data between the adaptive coding and modulation leader hub and the edge follower hub through one or more additional network hubs of the plurality of network hubs.

In one or more embodiments of the method, the plurality of network hubs are configured to be located above an atmosphere of the Earth.

In one or more embodiments of the method, the plurality of network hubs are configured to be located within an atmosphere of the Earth.

A system is provided herein. The system includes a distributed adaptive coding and modulation network having a plurality of network hubs and two endpoint devices. The two endpoint devices are operational to communicate with two of the plurality of network hubs via two respective wireless links. The plurality of network hubs are operational to: move relative to Earth; communicate among each other using one or more inter-hub links; and elect one of the plurality of network hubs to operate as an adaptive coding and modulation leader hub based on a leader election technique. A remainder of the plurality of network hubs operate as adaptive coding and modulation follower hubs. The adaptive coding and modulation leader hub is further operational to: negotiate a current modulation and coding scheme among a plurality of available modulation and coding schemes with the adaptive coding and modulation follower hubs between the two endpoint devices based on a session management protocol; communicate with a first endpoint device of the two endpoint devices; relay data between the two endpoint devices through the one or more inter-hub links and an edge follower hub of the adaptive coding and modulation follower hubs using the current modulation and coding scheme; and dynamically renegotiate the current modulation and coding scheme in response to a change in link conditions based on the session management protocol. The edge follower hub is further operational to: communicate with a second endpoint device of the two endpoint devices; and relay the data between the two endpoint devices through the one or more inter-hub links and the adaptive coding and modulation leader hub using the current modulation and coding scheme.

The above features and advantages, and other features and advantages of the present disclosure are readily apparent from the following detailed description of the best modes for carrying out the disclosure when taken in connection with the accompanying drawings.

DETAILED DESCRIPTION

Embodiments of the present disclosure include a system and/or method for performing Adaptive Coding and Modulation (ACM) between two bidirectional communication endpoint devices (e.g., modems) interconnected by a transport network of arbitrary and changeable topology. The adaptive coding and modulation automatically changes a forward error correction and a modulation of a link to compensate for changes in link conditions. The transport network may represent an optical backbone network, a radio-frequency backbone network, or a combination of the two. Network hubs of the transport network may be controlled using a leadership election technique to negotiate a leader hub role and one or more follower hub roles, a session management protocol to negotiate an optimal modulation and coding (MODCOD) scheme between the endpoint devices, and an adaptive coding and modulation control technique executed by a controller in each network hub. The system/method allows interconnections through a variety of transport networks, where instead of a single central hub, multiple hubs are effectively distributed across an originating edge and a terminating edges of the transport (or backbones) networks. The multiple hubs allow the adaptive coding and modulation to be performed across networks of arbitrary topologies with arbitrary connectivity, without the limitations associated with a single centralized hub.

Figure 1:
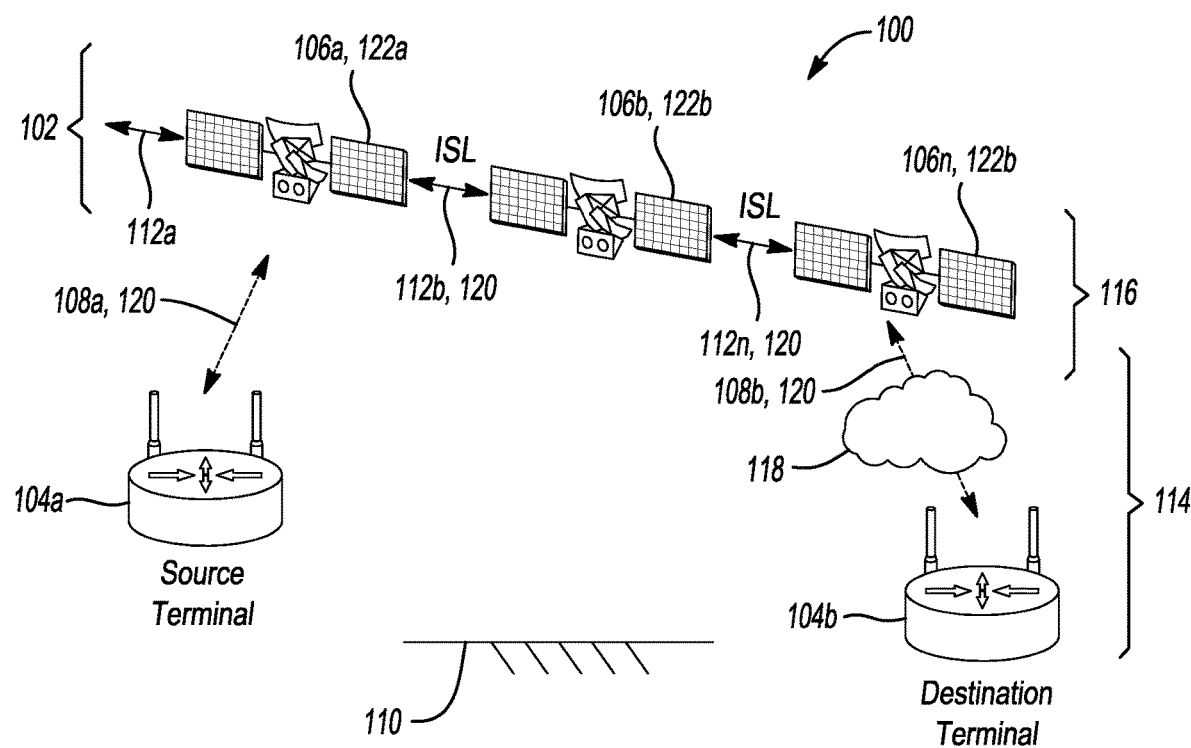
FIG. 1 is a schematic diagram of a system in accordance with one or more exemplary embodiments.

Referring to FIG. 1, a schematic diagram of an example system 100 is shown in accordance with one or more exemplary embodiments. The system 100 includes a distributed adaptive coding and modulation network 102 (or backbone) and multiple endpoint devices 104a-104b (two illustrated). The distributed adaptive coding and modulation network 102 generally includes multiple network hubs 106a-106n. The network hubs 106a-106n are operational to move relative to Earth 110. In various embodiments, the network hubs 106a-106n may be located in an atmosphere 114 above the Earth 110 (e.g., endo-atmospheric). In other embodiments, the network hubs 106a-106n may be located in outer space 116, above the atmosphere 114 of the Earth 110 (e.g., exo-atmospheric). Weather conditions (e.g., clouds, rain, etc.) 118 may be present between the endpoint devices 104a-104b and the network hubs 106a-106n.

The endpoint devices 104a-104b and respective network hubs 106a-106n (e.g., network hubs 106a and 106n) are operational to communicate with each other through respective wireless links 108a-108b. The network hubs 106a-106n are operational to communicate with each other through one or more inter-hub links 112a-112n. Data 120 may be transferred bidirectionally between the endpoint devices 104a-104b via the wireless links 108a-108b and the inter-hub links 112a-112n (e.g., inter-hub links 112b and 112n are illustrated).

The distributed adaptive coding and modulation network 102 implements a multiple-hub moving backbone network either exo-atmospheric in outer space 116, or endo-atmospheric in the atmosphere 114 of the Earth 110. The distributed adaptive coding and modulation network 102 is operational to transfer the data 120 between the endpoint device 104a-104b under a variety of changing link conditions. The changing link conditions may include, but are not limited to changing offered data loads, changing mobility events, link failures, changing signal-to-noise (SNR) ratios, changing estimated power margins, changing data rates, changing inter-hub distances, and changing inter-hub interferences.

The endpoint devices 104a-104b implement devices with a bidirectional modem capabilities. The endpoint devices 104a-104b are operational to send and receive the data 120 to and from the distributed adaptive coding and modulation network 102 via the wireless links 108a-108b. The endpoint devices 104a-104b are operational transmit and receive the data 120 at several different data rates. The endpoint devices 104a-104b are dynamically reconfigurable to operate at several different modulation and coding schemes. In various embodiments, one or both endpoint devices 104a-104b may be located on the Earth 110 at either stationary positions or moving positions. For example, an endpoint device 104b may be part of ground-based station or on a moving platform (e.g., a truck, a ship, or a train). In other embodiments, one or more endpoint devices 104a-104b may be located above the Earth 110 at either stationary positions or moving positions. For example, an endpoint device 104a may be located on a tower, in an aircraft, or attached to a balloon moving through the atmosphere 114. In still other embodiments, one or more endpoint devices 104a-104b may be located in outer space 116 and in an orbit (e.g., a low earth orbit) about the Earth 110.

The network hubs 106a-106n implement moving bidirectional modems. The network hubs 106a-106n are operational to send and receive the data 120 to and from the endpoint devices 104a-104b via the wireless links 108a-108b under the variety of changing link conditions. The network hubs 106a-106n are operational to send and receive the data 120 among each other via the inter-hub links 112a-112n under a variety of changing intra-link conditions.

In various embodiments, the network hubs 106a-106n may be satellites in orbit (e.g., low earth orbit, medium earth orbit, geosynchronous orbit, hybrid constellations, and the like) in outer space 116. In other embodiments, the network hubs 106a-106n may be aircraft, balloons and/or rockets airborne within the atmosphere 114 above the Earth 110.

The wireless links 108a-108b implements radio-frequency communication links and/or microwave links. The wireless links 108a-108b are operational to convey the data 120 between the endpoint devices 104a-104b and corresponding network hubs 106a-106n. In various embodiments, the data 120 may be conveyed bidirectionally through the wireless links 108a-108b. In some embodiments, the data 120 may be conveyed unidirectionally through the wireless links 108a-108b.

The inter-hub links 112a-112n implement optical communication links, microwave communication links and/or radio-frequency communication links. The inter-hub links 112a-112n generally form a high speed (e.g., >200 gigabits/second) backbone to transfer the data 120 among the network hubs 106a-106n.

The atmosphere 114 is the air that surrounds the Earth 110. The atmosphere 114 generally extends from ground level to an altitude of approximately 100 kilometers above sea level (e.g., the Kármán line).

Outer space 116 is the region above the atmosphere 114. Outer space 116 generally extends from 100 kilometers above sea level and higher. Other definitions of the boundary between the atmosphere 114 and outer space 116 may be utilized to meet the design criteria of a particular application.

The data 120 implements user data and control data. The data 120 is transferred between the endpoint devices 104a-104b via the wireless links 108a-108b and one or more of the inter-hub links 112a-112n. In various embodiments, the data 120 may be transferred in both directions, from a first endpoint device 104a to a second endpoint device 104b, and from the second endpoint device 104b to the first endpoint device 104a. In other embodiments, the data 120 may be transferred in a single direction. The control portion of the data 120 may include, but is not limited to link quality metrics (e.g., SNR, power margins, and the like.)

Figure 2:
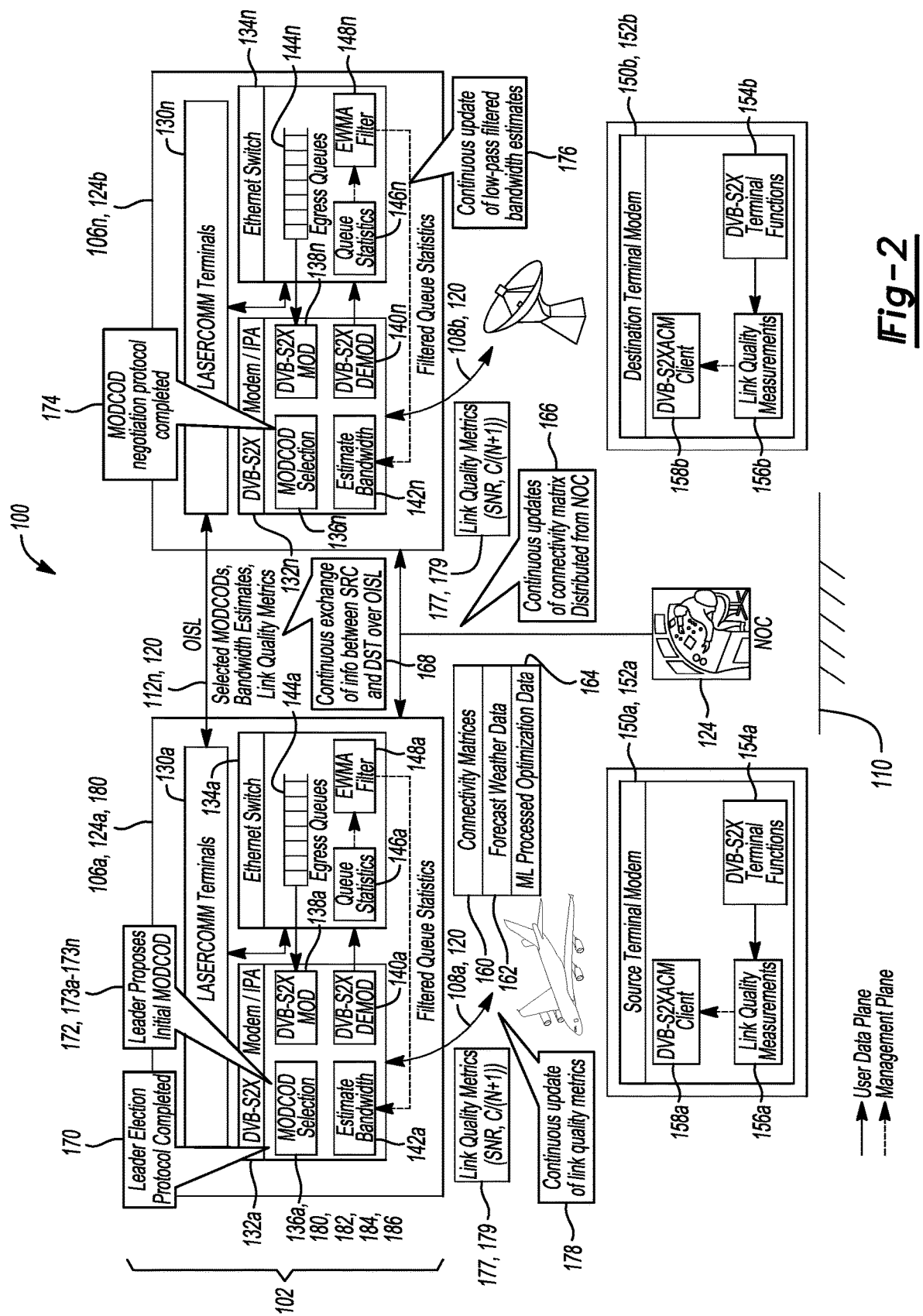
FIG. 2 is a schematic functional block diagram of the system in accordance with one or more exemplary embodiments.

Referring to FIG. 2, with reference back to FIG. 1, a schematic functional block diagram of an example implementation of the system 100 is shown in accordance with one or more exemplary embodiments. The example illustrates the network hubs 106a and 106n in communication with the endpoint devices 104a-104b, and a network operations center 126. In various embodiments, one or more network hubs 106b-106m (not shown) may reside between the network hubs 106a and 106n. In other embodiments, the network hubs 106a and 106n may be in direct communication with each other via the inter-hub link 112n.

The network hubs 106a and 106n include respective communication terminals 130a and 130n, respective network modems 132a and 132n, and respective network switches 134a and 134n. The network modems 132a and 132n include respective modulation and coding scheme selection blocks 136a and 136n, respective modulation blocks 138a and 138n, respective demodulation blocks 140a and 140n, and respective bandwidth estimation blocks 142a and 142n. The network switches 134a and 134n include respective queue blocks 144a and 144n, respective queue statistics blocks 146a and 146n, and respective filter blocks 148a and 148n. The other network hubs 106b-106m (not shown) have similar configurations.

The endpoint devices 104a-104b include respective terminal modems 150a and 150b. One of the endpoint devices (e.g., 104a in the example) may be designated as a source terminal 152a. The other endpoint device (e.g., 104b) may be designated as a destination terminal 152b. The endpoint devices 104a-104b include respective terminal function blocks 154a and 154b, respective link quality measurement blocks 156a and 156b, and respective adaptive coding and modulation clients 158a and 158b.

The network operations center (NOC) 126 is operational to supervise, monitor and maintain the distributed adaptive coding and modulation network 102. In some embodiments, the network operations center 126 may be based at a predetermined location on the Earth 110. In other embodiments, the network operations center 126 may be mobile and/or located above the Earth 110. The network operations center 126 provides a connectivity matrix 160, forecasted weather data 162, and machine learning processed optimization data 164 to the network hubs 106a-106n. The network operations center 126 is also operational to upload 166 continuous (or periodic) to the network hubs 106a-106n various updates of the connectivity matrix 160.

The communication terminals 130a-130n implement inter-hub communications terminals. In various embodiments, the communication terminals 130a-130n implement laser communications terminals, optical communications terminals, radio-frequency communications terminals, microwave terminals, or combinations thereof. The communication terminals 130a-130n are operational to transfer the data 120 and command information 168 among the network hubs 106a-106n. The command information 168 may include, but is not limited to, selected modulation and coding schemes, bandwidth estimates, and link quality estimates. The command information 168 also facilitates exchanges of adaptive coding and modulation information between the first endpoint device 104a and the second endpoint device 104b.

The network modems 132a-132n are operational to control communications among the network hubs 106a-106n and the endpoint devices 104a-104b. In various embodiments, the network modems 132a-132n implement a digital satellite television broadcast standard. In particular, the standard may be the Digital Video Broadcasting Satellite Second Generation Extended (DVB-S2X) standardized by the Digital Video Broadcast Project Office, Geneva, Switzerland. The network modems 132a-132n are also operational to implement an Interior Point algorithm (IPA) to solve optimization problems. Other standards may be implemented to meet the design criteria of a particular application.

The network switches 134a-134n implement network switching circuits that route and buffer information among the inter-hub links 112a-112n and the wireless links 108a-108b. In various embodiments, the network switches 134a-134n may implement Ethernet switches.

The modulation and coding scheme selection blocks 136a-136n are operational to elect a particular network hub 106a-106n to act as an adaptive coding and modulation leader hub 122a (e.g., 106a as illustrated) based on a leader election technique 170. The remainder of the network hubs (e.g., 106b-106n) operate as adaptive coding and modulation follower hubs 122b (e.g., 106n as illustrated). After the leader election technique 170 is complete, the adaptive coding and modulation leader hub 122a is operational to propose 172 an initial modulation and coding scheme to the adaptive coding and modulation follower hubs 122b. The adaptive coding and modulation leader hub 122a subsequently negotiates a current modulation and coding scheme (e.g., 173a) among several available modulation and coding schemes 173a-173n with the adaptive coding and modulation follower hubs 122b between the two endpoint devices 104a-104b based on a session management protocol 180 and a priority 182 of messages 186. Selection of the current modulation and coding scheme 173a is completed 174 by the adaptive coding and modulation follower hubs 122b. Thereafter, the adaptive coding and modulation leader hub 122a may dynamically renegotiate the current modulation and coding scheme 173a (e.g., from 173a to 173b) in response to changes in the link quality metrics 178 (or link conditions) of the wireless links 108a-108b and/or the inter-hub link 112a-112n based on the session management protocol 180.

Where the adaptive coding and modulation leader hub 122a is in communication with one of the endpoint devices 104a-104b, the adaptive coding and modulation leader hub 122a may also be referred to as an edge leader hub 124a. Where an adaptive coding and modulation follower hub 122b is in communication with one of the endpoint devices 104a-104b, such adaptive coding and modulation follower hub 122b may be referred to as an edge follower hub 124b. The data 120 is relayed between the two endpoint devices 104a-104b through the one or more inter-hub links 112a-112n, the edge leader hub 124a, and the edge follower hub 124b using the current modulation and coding scheme 173a.

The modulation blocks 138a-136n are operational to provide appropriate modulation for the data 120 and the command information 168.

The demodulation blocks 140a-140n are operational to provide appropriate demodulation for the data 120 and the command information 168.

The bandwidth estimation blocks 142a-142n are operational to estimate a bandwidth suitable to accommodate the data 120 and the command information 168 based on filtered queue occupancy statistics 176 provided by the filter blocks 148a-148n.

The queue blocks 144a-144n implement egress queues. The queue blocks 144a-144n are operational to buffer the data 120 flowing between the endpoint devices 104a-104n.

The queue statistics blocks 146a-146n are operational to monitor the queue block 144a-144n and generate respective queue statistics. The queue statistics are presented to the respective filter blocks 148a-148n.

The filter blocks 148a-148n are operational to filter the respective queue statistics to generate the filtered queue occupancy statistics 176. In some embodiments, the filter blocks 148a-148n implement exponentially weighted moving average (EWMA) filters. The filtered queue occupancy statistics 176 are presented to the respective bandwidth estimation blocks 142a-142n.

The terminal modems 150a-150b implement bidirectional modems. The terminal modems 150a-150b are operational to send and receive the data 120 to and from the edge leader hub 124a and the follower hub 124b via the wireless links 108a-108b. The terminal modems 150a-150b are operational transmit and receive the data 120 at several different data rates. The terminal modems 150a-150b are dynamically reconfigurable to operate at several different modulation and coding schemes. One of the terminal modems 150a-150b may be designated as a source terminal modem. The other terminal modem 150a-150b may be designated as a destination terminal modem.

The terminal function blocks 154a-154b are operational to perform one or more operations that control functions of the respective endpoint devices 104a-104b.

The link quality measurement blocks 156a-156b are operational to measure a quality of respective wireless links 108a-108b to the edge leader hub 124a and the edge follower hub 124b. The quality of the respective wireless links 108a-108b may be transferred (continuously or periodically) to the edge leader hub 124a and the edge follower hub 124b to update associated link quality metrics 178. The link quality metrics may include, but are not limited to signal-to-noise ratios (SNR) 177 and power margins (C/(N+ 1)) 179. Other link quality metrics may be utilized to meet the design criteria of a particular application.

The adaptive coding and modulation clients 158a-158b are operational to perform one or more operations that create the data 120 and/or consume the data 120. For example, the adaptive coding and modulation client 158a associated with the source terminal 152a may generate the data 120. At the other end of the system 100, the adaptive coding and modulation client 158b associated with the destination terminal 152b may receive and act upon the data 120.

Figure 3:
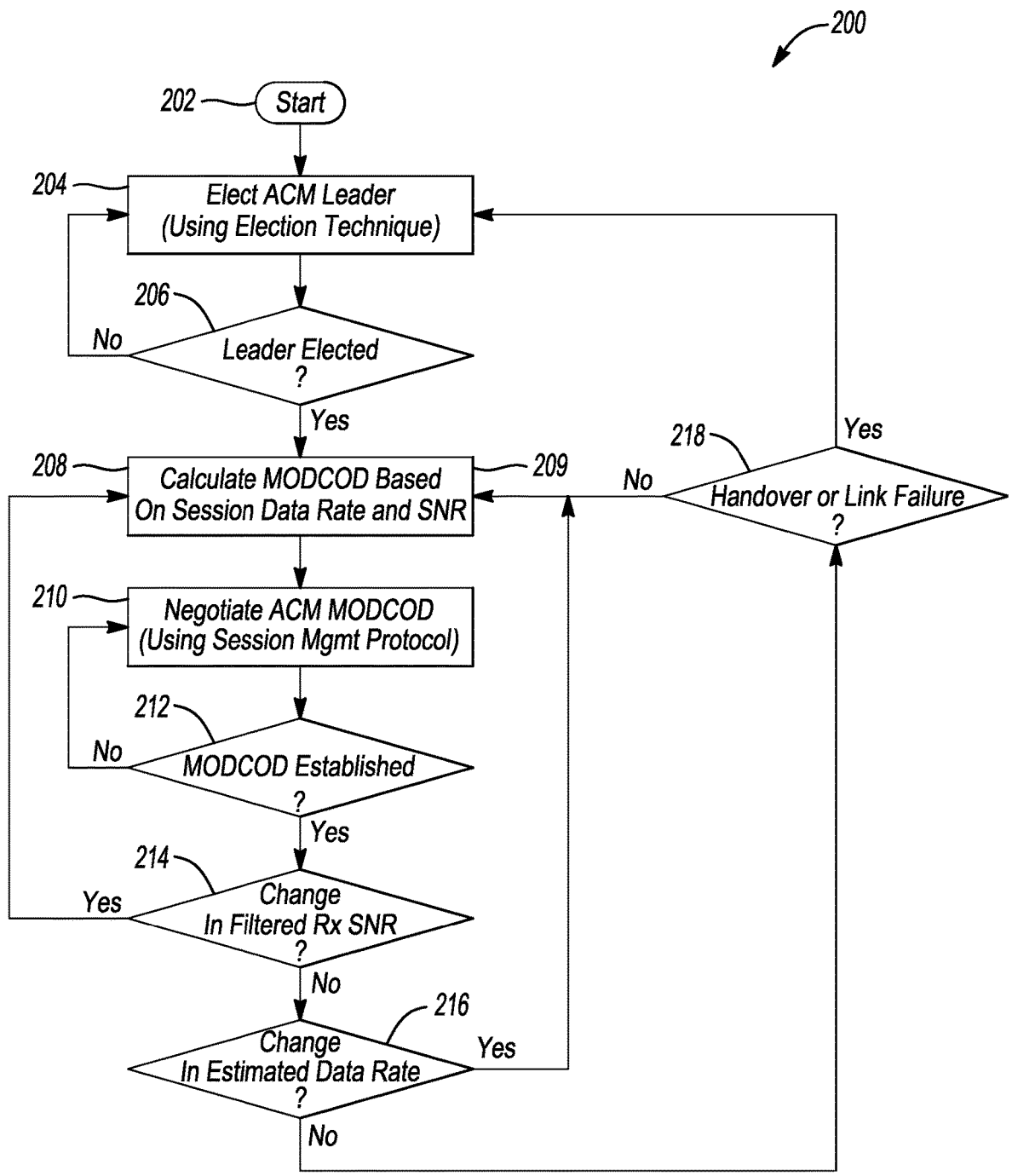
FIG. 3 is a flow diagram for adaptive coding and modulation control in accordance with one or more exemplary embodiments

Referring to FIG. 3, with reference back to FIGS. 1 and 2, a flow diagram of an example method 200 for adaptive coding and modulation control is shown in accordance with one or more exemplary embodiments. The method 200 (or process) is implemented by the network hubs 106a-106n. The method 200 generally includes steps 202 to 218, as illustrated. The sequence of steps is shown as a representative example. Other step orders may be implemented to meet the criteria of a particular application.

The method 200 starts in the step 202. In the step 204, the adaptive coding and modulation leader (e.g., the adaptive coding and modulation leader hub 122a) is elected using the leader election technique 170. The step 206 may return to the step 204 until an adaptive coding and modulation leader hub 122a is elected. Once elected, the adaptive coding and modulation leader hub 122a may select a modulation and coding scheme in the step 208 based on a requested data rate 209 for the session and the current signal-to-noise ratio 177. The session management protocol may be used in the step 210 to negotiate an adaptive coding and modulation scheme in the step 210. The step 212 may return to the step 210 until a next current modulation and coding scheme (e.g., 173b) is established.

Once the modulation and coding scheme is established, a check is performed in the step 214 for a change in the filtered received data signal-to-noise ratio 177. If the change is detected, the method 200 returns to the step 208 to recalculate the current modulation and coding scheme 173a. If no change is detected, another check is performed in the step 216 for a change in the requested data rate 209. If a change in the requested data rate 209 is detected, the method 200 returns to the step 208 to recalculate the current modulation and coding scheme 173a. If no change is detected, a check is performed in the step 218 for a handover between the edge hubs 124a-124b and the endpoint devices 104a-104b, link issues among the inter-hub links 112a-112n, and/or link issues among the wireless links 108a-108b. If a handover is detected, the method 200 returns to the step 204 to elect a new adaptive coding and modulation leader hub 122a. If a link issue is detected, the method 200 returns to the step 208 to reselect the modulation and coding scheme.

Figure 4:
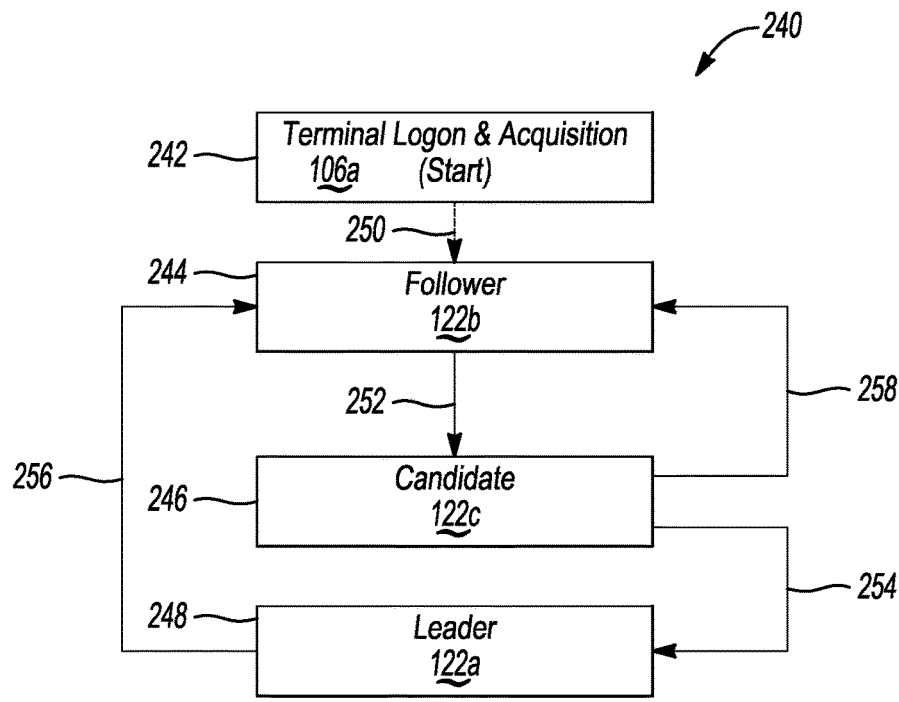
FIG. 4 is a state transition diagram for a leader election technique in accordance with one or more exemplary embodiments.

Referring to FIG. 4, with reference back to FIGS. 1 and 2, a state transition diagram 240 of example states for the leader election technique 170 is shown in accordance with one or more exemplary embodiments. The state transition diagram 240 (or process) is implemented in each network hub 106a-106n. The state transition diagram 240 generally includes states 242 to 248 and transitions 250 to 258, as illustrated. In the example, the network hub 106a is shown. Similar state transition diagrams 240 are implemented in the other network hubs 106b-106n. The sequence of states/transitions is shown as a representative example. Other states/transition orders may be implemented to meet the criteria of a particular application.

The state transition diagram 240 may start with a terminal login and acquisition at the network hub 106a in the state 242 with a subsequent transition 250 to the state 244. In the state 244, the network hub 106a is defaulted as an adaptive coding and modulation follower hub 122b. If no adaptive coding and modulation leader hub 122a is available in the distributed adaptive coding and modulation network 102, the state transition diagram 240 follows transition 252 to the state 246. In the state 246, the network hub 106a is considered an adaptive coding and modulation candidate hub 122c to become the adaptive coding and modulation leader hub 122a. If the network hub 106a receives votes to be the adaptive coding and modulation leader hub 122a, the transition 254 moves the adaptive coding and modulation candidate hub 122c to the state 248. In the state 248, the adaptive coding and modulation candidate hub 122c is considered the adaptive coding and modulation leader hub 122a.

If the adaptive coding and modulation leader hub 122a discovers one or more other adaptive coding and modulation candidate hubs 122c with higher vote totals, the adaptive coding and modulation leader hub 122a follows the transition 256 back to the state 244 where the network hub 106a is designated as an adaptive coding and modulation follower hub 122b. Upon detection of a mobility event, logoff and/or issues with the links, a new round of voting may begin. Therefore, the state transition diagram 240 follows the transition 252 to the state 246 where the network hub 106a is again designated as an adaptive coding and modulation candidate hub 122c. From the state 246, if the network hub 106a discovers a current adaptive coding and modulation leader hub 122a in the distributed adaptive coding and modulation network 102 and/or a new round of voting has started, the network hub 106a follows the transition 258 back to the state 244 and becomes an adaptive coding and modulation follower hub 122b.

Figure 5:
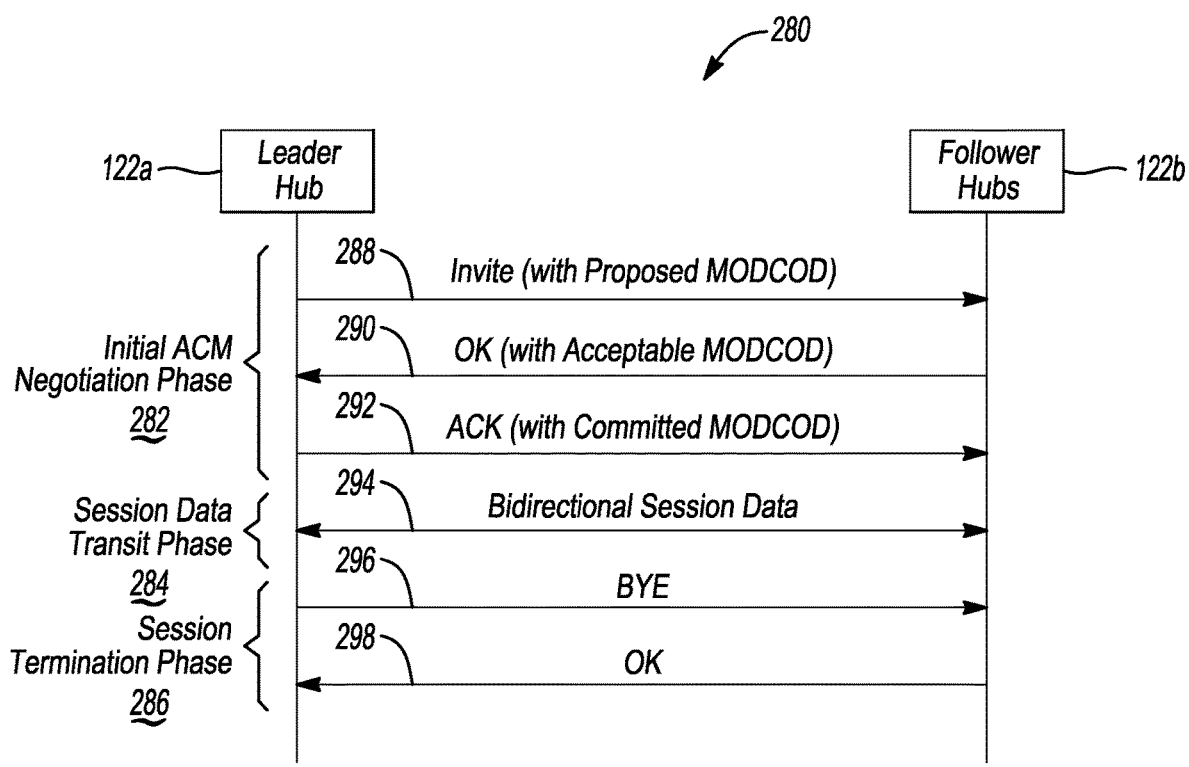
FIG. 5 is a flow diagram for a session management protocol in accordance with one or more exemplary embodiments.

Referring to FIG. 5, with references back to FIGS. 1 and 2, a flow diagram of an example method 280 for the session management protocol 180 is shown in accordance with one or more exemplary embodiments. The method 280 is implemented by the network hubs 106a-106n. The method 280 generally includes phases 282 to 286 and steps 288 to 298, as illustrated. The sequence of phases and steps is shown as a representative example. Other phase/step orders may be implemented to meet the criteria of a particular application.

In the negotiation phase 282, the adaptive coding and modulation leader hub 122a may present an initial proposed modulation and coding scheme to the adaptive coding and modulation follower hubs 122b in the step 288. If the adaptive coding and modulation follower hubs 122b respond with an acceptance of the initial proposed modulation and coding scheme in the step 290, the adaptive coding and modulation leader hub 122a may designate the initial proposed modulation and coding scheme as the current modulation and coding scheme 173a. The adaptive coding and modulation leader hub 122a subsequently sends an acknowledgement with the current modulation and coding scheme 173a in the step 292 to the adaptive coding and modulation follower hubs 122b. The adaptive coding and modulation follower hubs 122b begin using the current modulation and coding scheme 173a.

In the session data transit phase 284, the adaptive coding and modulation leader hub 122a and the adaptive coding and modulation follower hubs 122b transfer bidirectional session data (e.g., the data 120) in the step 294 among the network hubs 106a-106n logically in a direct path between the endpoint devices 104a-104b. In some embodiments, the network hubs 106a-106n not in the direct path between the endpoint devices 104a-104b may be excluded from the step 294.

In the session termination phase 286, the adaptive coding and modulation leader hub 122a may transmit an end (e.g., BYE) message to the follower hubs 122b in the step 296. The adaptive coding and modulation follower hubs 122b respond to the end message by ending the session internally and reply with an acknowledgement (e.g., OK) back to the adaptive coding and modulation leader hub 122a in the step 296. The adaptive coding and modulation leader hub 122a may end the session internally upon receipt of the acknowledgement from each adaptive coding and modulation follower hub 122b.

Figure 6:
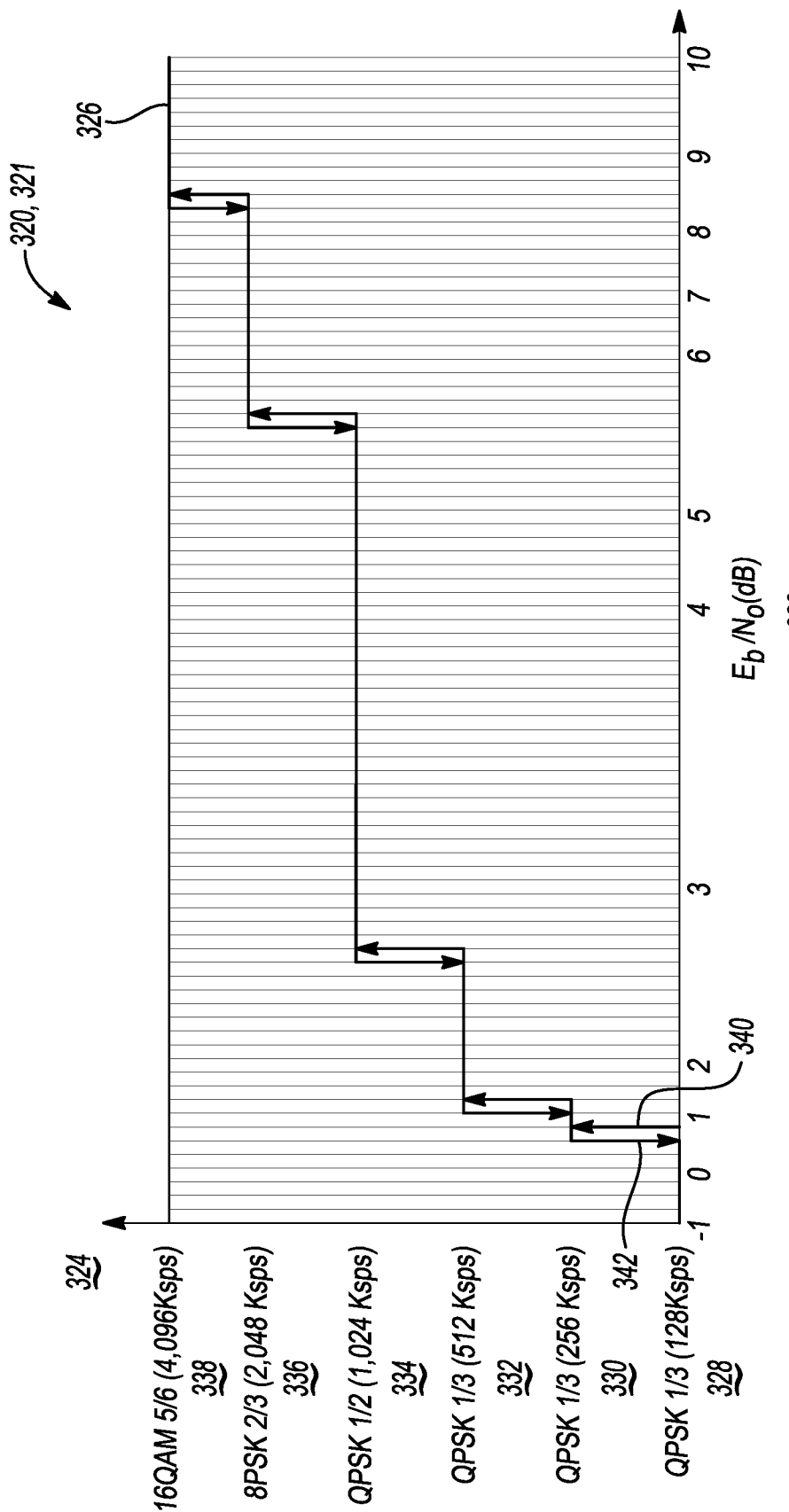
FIG. 6 is a graph of a modulation and coding scheme switching method in accordance with one or more exemplary embodiments.

Referring to FIG. 6, with references back to FIG. 1, a graph 320 of an example modulation and coding scheme switching method 321 is show in accordance with one or more exemplary embodiments. The graph 320 includes an X-axis 322 and a Y-axis 324. The X-axis 322 represent an energy per bit ($E_b$) to noise power spectral density ($N_o$) ratio. The $E_b/N_o$ represents a normalized signal-to-noise ratio measure. The Y-axis 324 represents several available modulation schemes. The modulation and coding scheme switching method 321 is based on the Eb/No ratio for a fixed Bit Error Rate (BER). A curve 326 illustrates the modulation scheme as a function of the $E_b/N_o$ ratio for the fixed Bit Error Rate. The modulation and coding scheme switching method 321 is implemented by the network hubs 106a-106n.

For various values of the $E_b/N_o$ ratio the curve 326 indicates that the modulation and coding scheme may use a different modulations 328-338 (e.g., quadrature phase-shift keying ⅓ at 128 kilo symbols per second (Ksps) for lowest values of the $E_b/N_o$ ratio, quadrature phase-shift keying ⅓ at 256 Ksps, quadrature phase-shift keying ⅓ at 512 Ksps, 8-phase phase-shift keying ⅔ at 2,048 Ksps, and 16-point quadrature amplitude modulation ⅚ at 4,096 Ksps for highest values of the $E_b/N_o$ ratio). Other modulations and/or numbers of modulations may be implemented to meet the design criteria of a particular application.

Transitions from adjacent modulations 328-338 may include hysteresis to suppress oscillations between the modulations. For example, a transition 340 from the modulation 328 to the modulation 330 may take place at a higher $E_b/N_o$ ratio (e.g., approximately 1.25 in the example) than a reverse transition 342 from the modulation 330 to the modulation 328 (e.g., at an $E_b/N_o$ ratio of approximately 0.5 in the example). Similar hysteresis are implemented for other adjacent modulations 330-338.

Figure 7:
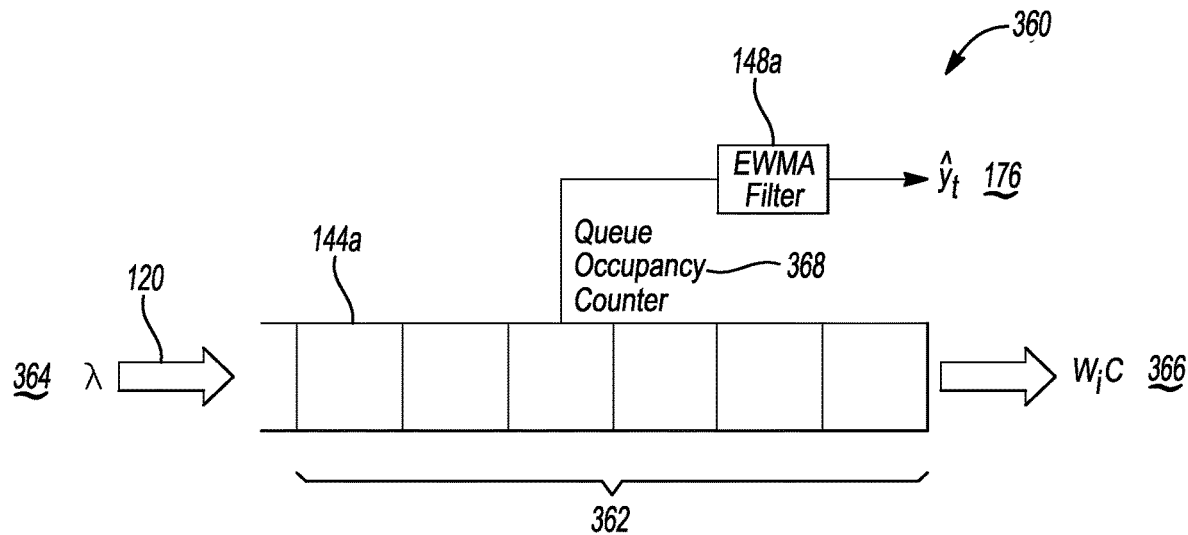
FIG. 7 is a schematic diagram for a first bandwidth queue estimation in accordance with one or more exemplary embodiments.

Referring to FIG. 7, with references back to FIGS. 1 and 2, a schematic diagram of an example method 360 for a first bandwidth queue estimation is shown in accordance with one or more exemplary embodiments. The method (or process) 360 is implemented by the queue blocks 144a-144n and the filter blocks 148a-148n. In the example, the queue block 144a and the filter block 148a are illustrated. Similar functions are performed by the queue blocks 144b-144n and the filter blocks 148b-148n.

A length 362 of the queue block 144a may be several (B>1) bytes. The queue block 144a may receive the data 120 at an arrival intensity 364 ($\lambda$). A weighted share of a per-terminal (or per-flow) capacity allocation 366 ($w_iC$) may leave the queue block 144a. Where $w_i$ is a per-flow weighting (e.g., a percentage share of aggregated link capacity), and C is the link capacity.

The filter block 148a may generate the filtered queue occupancy statistic 176 ($\hat{y}_t$) for the queue block 144a based on a queue occupancy counter 368. The filtered queue occupancy statistic 176 ($\hat{y}_t$) at time t may be expressed by equation 2 as follows:

$$\hat{y}_t = \alpha y_{t-1} + (1-\alpha)\hat{y}_{t-1} \quad \text{Eq. (1)}$$

Where $\hat{y}_t$ is calculated from measurements and measurement history, $y_{t-1}$ is a measured queue occupancy for prior measurement epoch, a is an EWMA weight (e.g., a percentage applied to current measured queue occupancy vs. historical measurements), and $\hat{y}_{t-1}$ is an EWMA (e.g., low-pass filtered) value calculated from the prior history.

The estimated bandwidth (BWest) based on the queue occupancy may be expressed by equation 2 as follow:

$$BWest = \sum_{i=0}^{7}\left(\frac{\hat{y}_t}{B}\right)w_iC \quad \text{Eq. (2)}$$

Where $\lambda \leq w_iC$: $\hat{y}_t \to 0$, and $\lambda > w_iC$: $\hat{y}_t \to B$.

Figure 8:
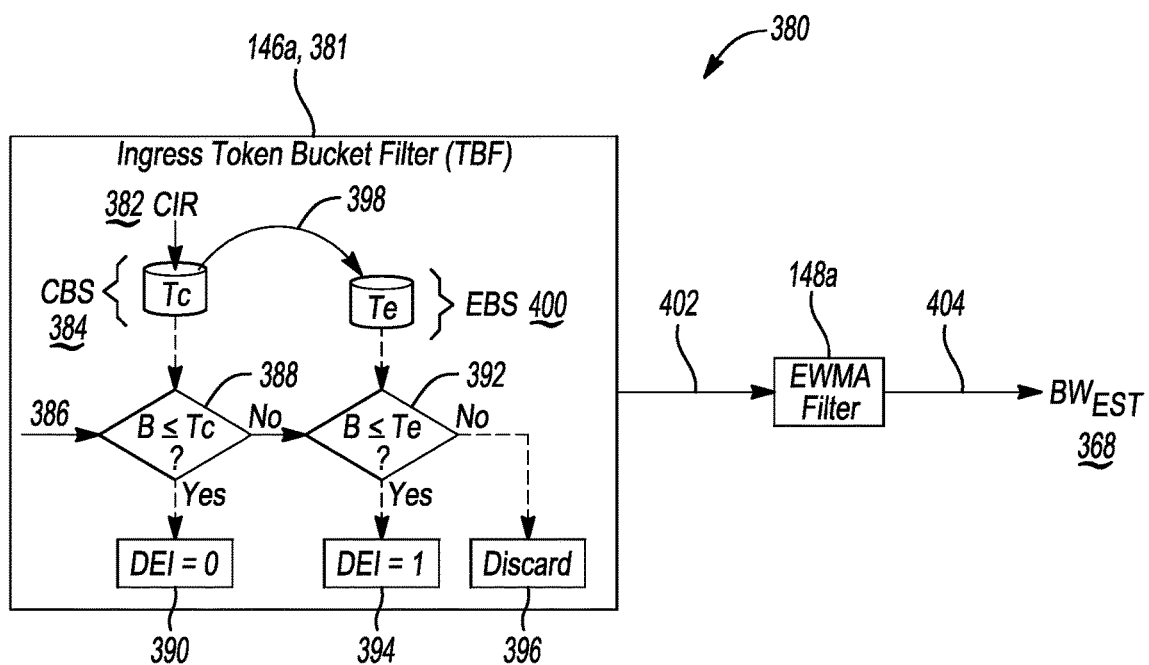
FIG. 8 is a schematic diagram for a second bandwidth queue estimation in accordance with one or more exemplary embodiments.

Referring to FIG. 8, with references back to FIGS. 1 and 2, a schematic diagram of an example method 380 for a second bandwidth queue estimation is shown in accordance with one or more exemplary embodiments. The method (or process) 380 is implemented by the queue blocks 144a-144n and the queue statistics blocks 146a-146n. In the example, the queue block 144a and the queue statistics block 146a are illustrated. The queue statistics block 146a may implement an ingress token bucket filter (TBF) 381. Similar functions are performed by the queue blocks 144b-144n and the queue statistics blocks 146b-146n. The method 380 generally includes steps 382 to 404, as illustrated. The sequence of steps is shown as a representative example. Other step orders may be implemented to meet the criteria of a particular application.

In the step 382, a committed information rate (CIR) may be received. Token credits (Tc) for a committed burst size (CBS) may be collected in the step 384.

In the step 386, a frame of size B bytes may arrive at time $t_j$. A check is performed in the step 388 to determine if B≤Tc. If true, a discard eligible indicator (DEI) may be set to false (e.g., zero or "0") in the step 390. If the step 388 return false, another check may be performed in the step 392 to determine if B≤Te (where Te=excess tokens). If true, the discard eligible indicator may be set to true (e.g., one or "1") in the step 394. If the step 392 is false, the frame is discarded in the step 396.

If the number of token credits overflows per the step 398, the excessive tokens (Te) may be collected for an excess burst size (EBS) in the step 400. Thereafter, the check may be formed in the step 392 to determine if B≤Te. If true, the discard eligible indicator may be set to true (e.g., one) in the step 394. If the step 392 is false, the frame is discarded in the step 396. In the step 402, a number of bytes (B) not discarded (e.g., DEI=0+DEI=1) per time epoch may be transferred to the filter block 148a. Thereafter, the filter block 148a generates and presents the bandwidth queue estimation (BWest) in the step 404.

Figure 9:
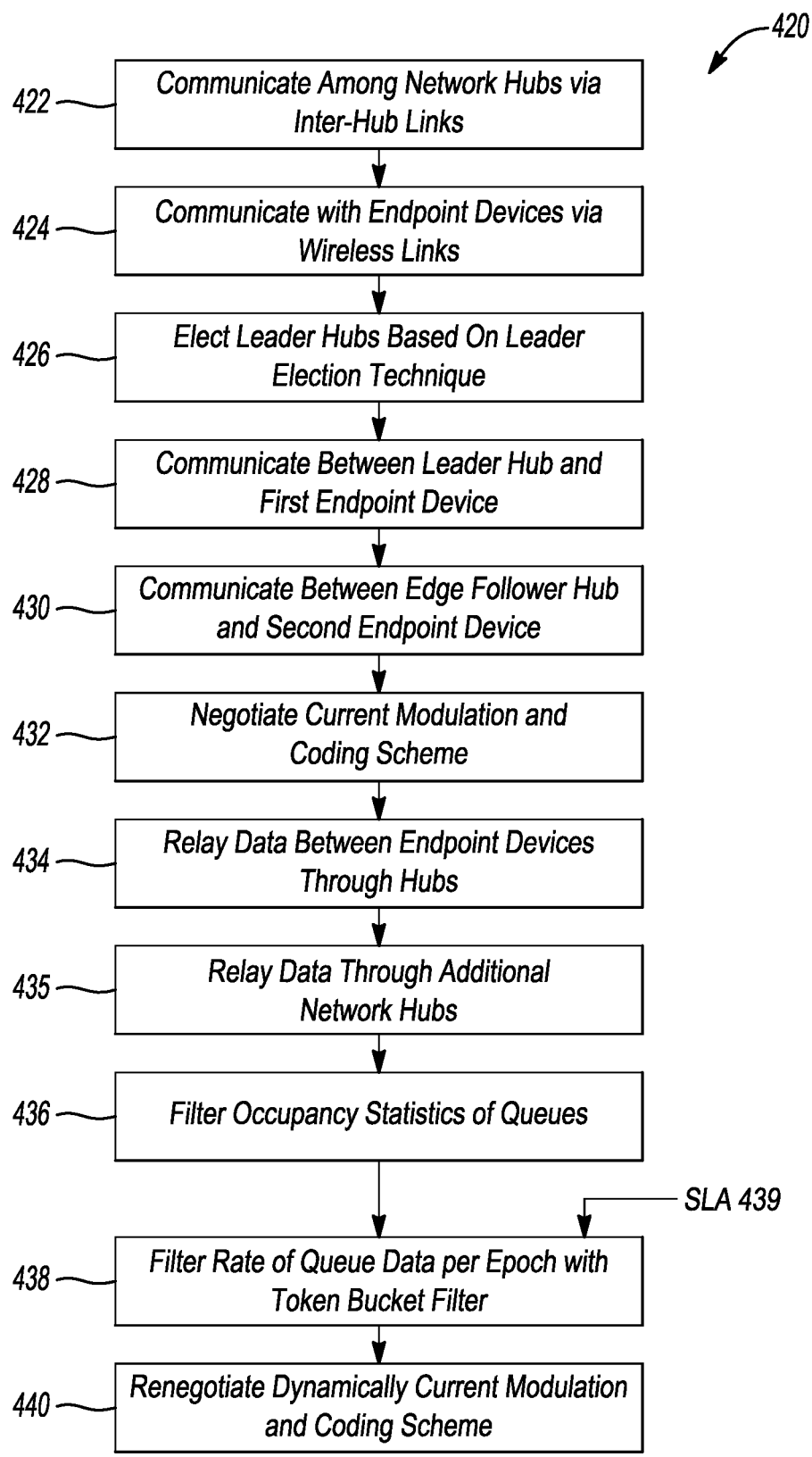
FIG. 9 is a flow diagram for distributed adaptive coding and modulation in accordance with one or more exemplary embodiment.

Referring to FIG. 9, with reference back to FIGS. 1 and 2, a flow diagram of an example method 420 for distributed adaptive coding and modulation is shown in accordance with one or more exemplary embodiment. The method (or process) 420 is implemented by the system 100. The method 420 includes steps 422 to 440, as illustrated. The sequence of steps is shown as a representative example. Other step orders may be implemented to meet the criteria of a particular application.

In the step 422, the system 100 may communicate among the network hubs 106a-106n using one or more inter-hub links 112a-112n. The system 100 may communicate between the network hubs 106a-106n and the two endpoint devices 104a-104b via the two respective wireless links 108a-108b in the step 424. The network hubs 106a-106 may elect one of the network hubs 106a-106n to operate as an adaptive coding and modulation leader hub 122a based on a leader election technique 170 in the step 426. A remainder of the network hubs 106a-106n may operate as adaptive coding and modulation follower hubs 122b.

In the step 428, the system 100 may communicate between the adaptive coding and modulation leader hub 122a and the first endpoint device 104a of the two endpoint devices 104a-104b. The system 100 may communicate between an edge follower hub 124b of the adaptive coding and modulation follower hubs 122b and a second endpoint device 104b of the two endpoint devices 104a-104b in the step 430.

The adaptive coding and modulation leader hub 122a negotiates a current modulation and coding scheme 173a among several available modulation and coding schemes 173a-173n with the adaptive coding and modulation follower hubs 122b between the two endpoint devices 104a-104b based on a session management protocol 180 in the step 432. In the step 434, the data 120 is relayed between the two endpoint devices 104a-104b through the adaptive coding and modulation leader hub 122a, the one or more inter-hub links 112a-112n, and the edge follower hub 124b using the current modulation and coding scheme 173a. The data 120 may be relayed between the adaptive coding and modulation leader hub 122a and the edge follower hub 124b through participation of one or more additional network hubs 106b-106m in the step 435.

The occupancy statistics 176 of the queues 144a-144n are filtered with the low-pass filters 148a-148n to maintain stability in the step 436. In the step 438 a rate of the data 120 per epoch in the queues 144a-144n is filtered with a token bucket filter 381 to meter and mark arriving traffic for compliance to a service level agreement (SLA) 439. The network hubs 106a-106n renegotiate the current modulation and coding scheme 173a dynamically in response to a change in link conditions (or link quality metrics) 178 based on the session management protocol 180 in the step 440.

Various embodiments of the system 100 generally include several elements.

(1) A leader election technique 170, used to allow the network hubs 106a-106n to agree on a current network hub to manage the modulation and coding scheme selection process.

(2) A session management protocol 180, used by the network hubs 106a-106n to dynamically (re)negotiate the preferred modulation and coding scheme for changing conditions.

(3) An adaptive coding and modulation control technique that dynamically (re)negotiates a preferred modulation and coding scheme in response to the leader election technique 170 and the session management protocol 180 upon detection of changing link conditions 178, changing offered load, mobility events, link failures, and/or weather conditions.

(4) A method used for modulation and coding scheme switching based on a combination of signal-to-noise ratio 177 and an estimated power margin 179.

(5) A method used for modulation and coding scheme renegotiation based on estimates of the requested data rate 209 being offered to the network hubs 106a-106n.

(6) A method of low-pass filtering the queue occupancy statistics or token bucket filter data rate per epoch to maintain a controlled theoretically stable feedback loop.

(7) A method of prioritizing 182 messages 186 associated with the leader election technique 170 and session management protocol 180 to reduce variations of control plane delays. The control plane delays may be a source of system instability in systems that employ multiple feedback loops that are coupled together.

In a nominal scenario: The adaptive coding and modulation leader hub 122a and the adaptive coding and modulation follower hubs 122b are under the same payload. In a distributed scenario: The adaptive coding and modulation follower hubs 122b are under a different payload than the adaptive coding and modulation leader hub 122a. The initial modulation and coding scheme is proposed by the adaptive coding and modulation leader hub 122a based on local conditions and parameters. The adaptive coding and modulation follower hubs 122b may negotiate to a more robust modulation and coding scheme, where appropriate.

A variety of leader election (or consensus) techniques may be implemented. A common leader election technique 170 may be Paxos or Raft consensus techniques. Other leader election techniques may be implemented to meet the design criteria of a particular application. Similarly, the session management protocol 180 may be implemented using a variety of standard protocols. In various embodiments, a standard protocol known as Session Initiation Protocol (SIP), including a subprotocol known as Session Description Protocol (SDP) may be used to exchange system parameters (e.g., link quality measurements, offered load estimates, and modulation and coding scheme identifiers, etc.). Alternate methods for offered load (e.g., the requested data rate 209) estimation include, but are not limited to (a) a method based on low-pass filtered queue occupancy statistics, and (b) a method based on low-pass filtered number of bytes being passed by the ingress Token Bucket Filter (TBF) per time epoch (e.g., seconds, minutes). Other methods for estimating offered load may be implemented to meet a design criteria of a particular application.

Embodiments of the system 100 provide an additional discriminating capability that improves link efficiency and link throughput between communicating modems. The system 100 may overcome legacy adaptive coding and modulation limitations of both source and destination terminals being attached to the same satellite, allowing adaptive coding and modulation to be employed in proliferated low earth orbit (LEO), medium earth orbit (MEO), geosynchronous orbit (GEO), and hybrid constellations that employ inter-satellite links, and the adaptive coding and modulation increases link robustness due to weather and other interferences.

As explained above and reiterated below, the present disclosure includes, without limitation, the following example implementations.

Clause 1. A distributed adaptive coding and modulation network comprising a plurality of network hubs operational to: move relative to Earth; communicate among each other using one or more inter-hub links; communicate with two endpoint devices via two respective wireless links; and elect one of the plurality of network hubs to operate as an adaptive coding and modulation leader hub based on a leader election technique, wherein a remainder of the plurality of network hubs operate as adaptive coding and modulation follower hubs; wherein the adaptive coding and modulation leader hub is further operational to: negotiate a current modulation and coding scheme among a plurality of available modulation and coding schemes with the adaptive coding and modulation follower hubs between the two endpoint devices based on a session management protocol; communicate with a first endpoint device of the two endpoint devices; relay data between the two endpoint devices through the one or more inter-hub links and an edge follower hub of the adaptive coding and modulation follower hubs using the current modulation and coding scheme; and dynamically renegotiate the current modulation and coding scheme in response to a change in link conditions based on the session management protocol; and wherein the edge follower hub is further operational to: communicate with a second endpoint device of the two endpoint devices; an relay the data between the two endpoint devices through the one or more inter-hub links and the adaptive coding and modulation leader hub using the current modulation and coding scheme.

Claims 2. The distributed adaptive coding and modulation network according to clause 1, wherein: the negotiation of the current modulation and coding scheme is further based on a signal-to-noise ratio and an estimated power margin.

Claims 3. The distributed adaptive coding and modulation network according to clause 1 or clause 2, wherein: the negotiation of the current modulation and coding scheme is further based on a requested data rate of the session management protocol offered by the two endpoint devices.

Claims 4. The distributed adaptive coding and modulation network according to clause 1 or clause 2, wherein the plurality of network hubs: include a plurality of queues operational to buffer the data; and are further operational to low-pass filter a plurality of occupancy statistics of the plurality of queues to maintain stability.

Claims 5. The distributed adaptive coding and modulation network according to clause 1 or clause 2, wherein the plurality of network hubs: include a plurality of queues operational to buffer the data; and are further operational to token bucket filter a rate of the data per epoch in the plurality of queues to meter and mark arriving traffic for compliance to a service level agreement.

Claims 6. The distributed adaptive coding and modulation network according to clause 1 or clause 2, wherein: the plurality of network hubs are further operational to prioritize a plurality of messages associated with the leader election technique and the session management protocol above the data from the two endpoint devices.

Claims 7. The distributed adaptive coding and modulation network according to clause 1 or clause 2, wherein: one or more additional network hubs of the plurality of network hubs participate in the relay of the data between the adaptive coding and modulation leader hub and the edge follower hub.

Claims 8. The distributed adaptive coding and modulation network according to clause 1 or clause 2, wherein: the plurality of network hubs are located above an atmosphere of the Earth.

Claims 9. The distributed adaptive coding and modulation network according to clause 1 or clause 2, wherein: the plurality of network hubs are located within an atmosphere of the Earth.

Claims 10. The distributed adaptive coding and modulation network according to clause 9, wherein: at least one of the two endpoint devices is airborne in the atmosphere.

Clause 11. A method for distributed adaptive coding and modulation, comprising communicating among a plurality of network hubs using one or more inter-hub links, wherein the plurality of network hubs are operational to move relative to Earth; communicating between the plurality of network hubs and two endpoint devices via two respective wireless links; electing, among the plurality of network hubs, one of the plurality of network hubs to operate as an adaptive coding and modulation leader hub based on a leader election technique, wherein a remainder of the plurality of network hubs operate as adaptive coding and modulation follower hubs; communicating between the adaptive coding and modulation leader hub and a first endpoint device of the two endpoint devices; communicating between an edge follower hub of the adaptive coding and modulation follower hubs and a second endpoint device of the two endpoint devices; negotiating, with the adaptive coding and modulation leader hub, a current modulation and coding scheme among a plurality of available modulation and coding schemes with the adaptive coding and modulation follower hubs between the two endpoint devices based on a session management protocol; relaying data between the two endpoint devices through the adaptive coding and modulation leader hub, the one or more inter-hub links, and the adaptive coding and modulation edge follower hub using the current modulation and coding scheme; and renegotiating the current modulation and coding scheme dynamically in response to a change in link conditions based on the session management protocol.

Clause 12. The method according to clause 11, wherein: the negotiating of the current modulation and coding scheme is based on a signal-to-noise ratio and an estimated power margin.

Clause 13. The method according to clause 11 or clause 12, wherein: the negotiating of the current modulation and coding scheme is based on a requested data rate of the session management protocol offered by the two endpoint devices.

Clause 14. The method according to clause 11 or clause 12, wherein the plurality of network hubs include a plurality of queues operational to buffer the data, the method further comprising: filtering a plurality of occupancy statistics of the plurality of queues with a plurality of low-pass filters to maintain stability.

Clause 15. The method according to clause 11 or clause 12, wherein the plurality of network hubs include a plurality of queues operational to buffer the data, the method further comprising: filtering a rate of the data per epoch in the plurality of queues with a token bucket filter to meter and mark arriving traffic for compliance to a service level agreement.

Clause 16. The method according to clause 11 or clause 12, further comprising: prioritizing in the plurality of network hubs a plurality of messages associated with the leader election technique and the session management protocol above the data from the two endpoint devices.

Clause 17. The method according to clause 11 or clause 12, further comprising: relaying the data between the adaptive coding and modulation leader hub and the edge follower hub through one or more additional network hubs of the plurality of network hubs.

Clause 18. The method according to clause 11 or clause 12, wherein: the plurality of network hubs are configured to be located above an atmosphere of the Earth.

Clause 19. The method according to clause 11 or clause 12, wherein: the plurality of network hubs are configured to be located within an atmosphere of the Earth.

Clause 20. A system comprising a distributed adaptive coding and modulation network having a plurality of network hubs; and two endpoint devices operational to communicate with two of the plurality of network hubs via two respective wireless links; wherein the plurality of network hubs are operational to: move relative to Earth; communicate among each other using one or more inter-hub links; and elect one of the plurality of network hubs to operate as an adaptive coding and modulation leader hub based on a leader election technique, wherein a remainder of the plurality of network hubs operate as adaptive coding and modulation follower hubs; and wherein the adaptive coding and modulation leader hub is further operational to: negotiate a current modulation and coding scheme among a plurality of available modulation and coding schemes with the adaptive coding and modulation follower hubs between the two endpoint devices based on a session management protocol; communicate with a first endpoint device of the two endpoint devices; relay data between the two endpoint devices through the one or more inter-hub links and an edge follower hub of the adaptive coding and modulation follower hubs using the current modulation and coding scheme; and dynamically renegotiate the current modulation and coding scheme in response to a change in link conditions based on the session management protocol; and wherein the edge follower hub is further operational to: communicate with a second endpoint device of the two endpoint devices; and relay the data between the two endpoint devices through the one or more inter-hub links and the adaptive coding and modulation leader hub using the current modulation and coding scheme.

This disclosure is susceptible of embodiments in many different forms. Representative embodiments of the disclosure are shown in the drawings and are herein described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A distributed adaptive coding and modulation network comprising:
    a plurality of network hubs operational to:
        move relative to Earth;
        communicate among each other using one or more inter-hub links;
        communicate with two endpoint devices via two respective wireless links; and
        elect one of the plurality of network hubs to operate as an adaptive coding and modulation leader hub based on a leader election technique, wherein a remainder of the plurality of network hubs operate as adaptive coding and modulation follower hubs;
    wherein the adaptive coding and modulation leader hub is further operational to:
        negotiate a current modulation and coding scheme among a plurality of available modulation and coding schemes with the adaptive coding and modulation follower hubs between the two endpoint devices based on a session management protocol;
        communicate with a first endpoint device of the two endpoint devices;
        relay data between the two endpoint devices through the one or more inter-hub links and an edge follower hub of the adaptive coding and modulation follower hubs using the current modulation and coding scheme; and
        dynamically renegotiate the current modulation and coding scheme in response to a change in link conditions based on the session management protocol; and
    wherein the edge follower hub is further operational to:
        communicate with a second endpoint device of the two endpoint devices; and
        relay the data between the two endpoint devices through the one or more inter-hub links and the adaptive coding and modulation leader hub using the current modulation and coding scheme.

2. The distributed adaptive coding and modulation network according to claim 1, wherein:
    the negotiation of the current modulation and coding scheme is further based on a signal-to-noise ratio and an estimated power margin.

3. The distributed adaptive coding and modulation network according to claim 1, wherein:

the negotiation of the current modulation and coding scheme is further based on a requested data rate of the session management protocol offered by the two endpoint devices.

4. The distributed adaptive coding and modulation network according to claim 1, wherein the plurality of network hubs:
include a plurality of queues operational to buffer the data; and
are further operational to low-pass filter a plurality of occupancy statistics of the plurality of queues to maintain stability.

5. The distributed adaptive coding and modulation network according to claim 1, wherein the plurality of network hubs:
include a plurality of queues operational to buffer the data; and
are further operational to token bucket filter a rate of the data per epoch in the plurality of queues to meter and mark arriving traffic for compliance to a service level agreement.

6. The distributed adaptive coding and modulation network according to claim 1, wherein:
the plurality of network hubs are further operational to prioritize a plurality of messages associated with the leader election technique and the session management protocol above the data from the two endpoint devices.

7. The distributed adaptive coding and modulation network according to claim 1, wherein:
one or more additional network hubs of the plurality of network hubs participate in the relay of the data between the adaptive coding and modulation leader hub and the edge follower hub.

8. The distributed adaptive coding and modulation network according to claim 1, wherein:
the plurality of network hubs are located above an atmosphere of the Earth.

9. The distributed adaptive coding and modulation network according to claim 1, wherein:
the plurality of network hubs are located within an atmosphere of the Earth.

10. The distributed adaptive coding and modulation network according to claim 9, wherein:
at least one of the two endpoint devices is airborne in the atmosphere.

11. A method for distributed adaptive coding and modulation, comprising:
communicating among a plurality of network hubs using one or more inter-hub links, wherein the plurality of network hubs are operational to move relative to Earth;
communicating between the plurality of network hubs and two endpoint devices via two respective wireless links;
electing, among the plurality of network hubs, one of the plurality of network hubs to operate as an adaptive coding and modulation leader hub based on a leader election technique, wherein a remainder of the plurality of network hubs operate as adaptive coding and modulation follower hubs;
communicating between the adaptive coding and modulation leader hub and a first endpoint device of the two endpoint devices;
communicating between an edge follower hub of the adaptive coding and modulation follower hubs and a second endpoint device of the two endpoint devices;
negotiating, with the adaptive coding and modulation leader hub, a current modulation and coding scheme among a plurality of available modulation and coding schemes with the adaptive coding and modulation follower hubs between the two endpoint devices based on a session management protocol;
relaying data between the two endpoint devices through the adaptive coding and modulation leader hub, the one or more inter-hub links, and the adaptive coding and modulation edge follower hub using the current modulation and coding scheme; and
renegotiating the current modulation and coding scheme dynamically in response to a change in link conditions based on the session management protocol.

12. The method according to claim 11, wherein:
the negotiating of the current modulation and coding scheme is based on a signal-to-noise ratio and an estimated power margin.

13. The method according to claim 11, wherein:
the negotiating of the current modulation and coding scheme is based on a requested data rate of the session management protocol offered by the two endpoint devices.

14. The method to claim 11, wherein the plurality of network hubs include a plurality of queues operational to buffer the data, the method further comprising:
filtering a plurality of occupancy statistics of the plurality of queues with a plurality of low-pass filters to maintain stability.

15. The method to claim 11, wherein the plurality of network hubs include a plurality of queues operational to buffer the data, the method further comprising:
filtering a rate of the data per epoch in the plurality of queues with a token bucket filter to meter and mark arriving traffic for compliance to a service level agreement.

16. The method according to claim 11, further comprising:
prioritizing in the plurality of network hubs a plurality of messages associated with the leader election technique and the session management protocol above the data from the two endpoint devices.

17. The method according to claim 11, further comprising:
relaying the data between the adaptive coding and modulation leader hub and the edge follower hub through one or more additional network hubs of the plurality of network hubs.

18. The method according to claim 11, wherein:
the plurality of network hubs are configured to be located above an atmosphere of the Earth.

19. The method according to claim 11, wherein:
the plurality of network hubs are configured to be located within an atmosphere of the Earth.

20. A system comprising:
a distributed adaptive coding and modulation network having a plurality of network hubs; and
two endpoint devices operational to communicate with two of the plurality of network hubs via two respective wireless links;
wherein the plurality of network hubs are operational to:
move relative to Earth;
communicate among each other using one or more inter-hub links; and
elect one of the plurality of network hubs to operate as an adaptive coding and modulation leader hub based on a leader election technique, wherein a remainder of the plurality of network hubs operate as adaptive coding and modulation follower hubs; and wherein the adaptive coding and modulation leader hub is further operational to:
  negotiate a current modulation and coding scheme among a plurality of available modulation and coding schemes with the adaptive coding and modulation follower hubs between the two endpoint devices based on a session management protocol;
  communicate with a first endpoint device of the two endpoint devices;
  relay data between the two endpoint devices through the one or more inter-hub links and an edge follower hub of the adaptive coding and modulation follower hubs using the current modulation and coding scheme; and
  dynamically renegotiate the current modulation and coding scheme in response to a change in link conditions based on the session management protocol; and
wherein the edge follower hub is further operational to:
  communicate with a second endpoint device of the two endpoint devices; and
  relay the data between the two endpoint devices through the one or more inter-hub links and the adaptive coding and modulation leader hub using the current modulation and coding scheme.

* * * * *